Patented Mar. 6, 1951

2,543,844

UNITED STATES PATENT OFFICE 2,543,844

PLASTICIZING SYNTHETIC RUBBER WITH A REACTION PRODUCT OF AN ALKYL MERCAPTAN AND A RUBBERY DIOLEFIN POLYMER

Charles F. Fryling, Bartlesville, Okla., assignor to Phillips Petroleum Company, a corporation of Delaware No Drawing. Application August 27, 1945, Serial No. 613,006

7 Claims. (Cl. 260—30.8)

This invention relates to a novel plasticizer for rubber and to a novel plasticized rubber product and method of preparing same. It relates in more particular aspects to such a plasticizer for synthetic rubber-like material and to the plasticized product as well as to the method of making such product.

Synthetic rubber, as referred to herein, is intended to include synthetic rubber-like materials made by the emulsion polymerization of conjugated diolefins or butadiene-1,3 hydrocarbons or substituted derivatives thereof, such as the haloprenes, either alone or in admixture with each other or with monomers copolymerizable therewith. The term polymer as used herein includes copolymers as well as products of polymerization of a single monomer. Conjugated diolefins include butadiene-1,3 itself and the hydrocarbon homologs thereof such as isoprene, piperylene, 2,3-dimethyl butadiene, and the like. Such monomers include in general readily polymerizable compounds containing an olefinic group, particularly a single olefinic group which is usually activated due to its presence at the end of a chain, as a vinyl group, or a vinylidene group, or in a conjugated system. Monomers suitable for this purpose are, for example, aryl olefins such as styrene, p-chlorostyrene, vinyl naphthalene, etc.; acrylic and substituted acrylic acids and their esters, nitriles and amides such as acrylic acid, methyl acrylate, ethyl acrylate, methyl methacrylate, ethyl methacrylate, acrylonitrile, ethacrylonitrile, methacrylamide and the like; methyl vinyl ether, methyl isopropenyl ketone, vinyl pyridine, vinylidine chloride, vinyl furane, vinyl acetate diethyl fumarate, etc.

Other synthetic rubber-like materials produced by emulsion polymerization may also be reacted to form the novel materials disclosed herein. Such rubbers include the chloroprene polymers, such as neoprene and the like. While the novel plasticizers described herein are particularly adaptable for use with such synthetic rubber-like materials, as are referred to above, they may also be used to plasticize natural rubbers, as well as synthetic rubbers or other rubber-like materials.

Synthetic rubber, produced by the process of emulsion polymerization, is first obtained in the form of a latex. In order to obtain a product exhibiting satisfactory properties, i. e., a rubber which can be readily milled and compounded to give satisfactory physical properties, such as tensile strength and elongation, it has become customary to include in the polymerization recipe small concentrations of materials, called modifiers, which usually consist of organic sulfur compounds of a type known as mercaptans. If too much mercaptan is added to the polymerization recipe, a soft, weak, sticky product is obtained, and it is found that the physical properties of the vulcanizates made from this material are greatly degraded, i. e., the material exhibits low tensile strength and low elongation.

In the manufacture of natural rubber articles, the usual procedure is to coagulate the rubber from latex, dry it, and then subject the material to a milling operation before incorporating the compounding ingredients such as carbon black, sulfur, antioxidant, and accelerator. It has long been recognized that natural rubber, during milling, undergoes a chemical reaction with atmospheric oxygen, known as oxidative breakdown. The rubber loses its retractivity, and when stretched, separates into long thin threads known as "legs." In reality, the material becomes truly plastic. This chemical breakdown can be conducted on the mill, or, to save electrical energy and time, in large machines called Banburys, or yet, in large extrusion machines called plasticators. The process of oxidative breakdown, however conducted, leads to a decrease in the average molecular weight of the polymer molecules which comprise the substance, rubber. This process is frequently referred to as one of "plasticizing" the rubber and as above indicated generally comprises a softening action.

Synthetic rubber, on the other hand, while treated in almost exactly the same manner as natural rubber, is less susceptible to oxidative breakdown and consequently more difficult to mill. Various expedients have been resorted to in order to overcome this defect. The addition of modifiers to the polymerization recipe is an example of such an expedient.

Various softeners, such as pine tar, rosin, synthetic condensation products, and high molecular weight esters have been added to the synthetic rubber on the mill to accomplish this same end. Although the number of such substances tested is legion, and although some of them possess advantages over others when judged on the basis of price or efficiency, it nevertheless remains true that none of them have proved entirely satisfactory. The deleterious effects of these materials on the final physical properties of the synthetic rubber become manifest at concentrations lower than those required to obtain the desired degree of softening on the mill.

Other means have also been used to secure the desired breakdown on the mill and to accelerate this process. Among these may be mentioned the use of chemical substances, such as "RPA No. 5" (50 per cent zinc salt of an aryl mercaptan and a neutral solvent), and the addition of a portion of overmodified synthetic rubber on the mill. The results of even this latter method, however, have not proved satisfactory in practice, and have always fallen short of anticipations. The amount of this low molecular weight rubber which it has been found necessary to add to secure adequate softening of average or tough polymers has resulted in too high a degradation of the other physical properties of the cured mixture. The relationship between these properties and the amount of overmodified synthetic rubber added has been found to be approximately linear over all practical concentrations.

It is evident from the above discussion that there has heretofore been no adequate and entirely satisfactory means available for working synthetic rubber on the mill for securing the requisite degree of plasticizing and softening action without at the same time very adversely affecting the final physical properties of the synthetic rubber. Furthermore, it frequently occurs that a large batch of synthetic rubber may be produced which is extremely tough, exceeding the limits of present specifications in this respect. The capabilities of present plasticizing processes are exceeded by such a batch and it is impossible to process it satisfactorily, so that it must be discarded at a considerable economic loss. While no very satisfactory use can be expected for tough polymers resulting from cross linkage, rubber which is difficult to mill because of high molecular weight, but which is comprised essentially of linear molecules, has been made with extremely great tensile strength and elongation. It would be highly desirable to be able to employ certain proportions of these strong, tough polymers in finished rubber products. They are at present undesirable and outside the specification limits simply because present processes are inadequate to plasticize such products.

It is therefore an object of the present invention to provide a novel composition for use in processing rubbers whereby increased plasticity and tack are realized. It is a further object of the present invention to provide a novel and efficient softener and plasticizer for rubber-like polymers which will permit rapid breakdown of refractory or unmodified stocks during milling. It is a still further object of the present invention to provide a novel synthetic rubber plasticizer characterized by its efficient action on gel-like polymers, by physical rather than by chemical breakdown, and by its vulcanizable properties and the large proportion which can thereby be incorporated in the finished synthetic rubber.

I have now found that a composition resulting from the interaction of a synthetic rubber of the type disclosed herein with a compound of the mercaptan type, particularly certain aliphatic mercaptans, is an extremely efficient plasticizer for synthetic rubber. I have found that the addition of such a composition to the synthetic rubber on the mill, or in Banbury or plasticator machines, results in immediate softening of the rubber, with the loss of retractivity and development of long "legs" characteristic of complete plasticizing action. Moreover, so efficient and rapid is this plasticizing action that I have found that substantially all batches of tough, off-specification, high molecular weight rubber may be quickly and satisfactorily processed by this means, avoiding the economic loss involved in discarding them, or enabling the use of such polymers deliberately in order to incorporate in the finished product the desirable physical properties which can only be had by the use of such polymers.

I have further found that the properties of the finished, vulcanized rubber compounds are not adversely affected by incorporation of ordinary amounts of my novel plasticizer, as was the case with prior art softeners, and the best quantity of softener to use may, therefore, be selected with respect to the characteristics of the raw polymer and the milling process without regard for its effect on the finished product. Indeed, even very large quantities of the new softener may be incorporated with impunity, and as hereinafter disclosed the plasticizer is itself vulcanizable and it may take part in the vulcanization reaction.

In its more general embodiment, my process comprises adding to the synthetic rubber on the mill a quantity of a generally soft material prepared by reaction of mercaptans with the synthetic rubber in the form of latex. This quantity may be readily controlled and adjusted to meet any desired requirements. Breakdown is thereby placed under direct and close control and very satisfactory rubbers can always be made.

The novel compositions which I employ are produced by interaction of aliphatic mercaptans with a synthetic rubber latex produced by aqueous emulsion polymerization, and are usually soft, plastic materials, or even syrups. The mercaptans which are applied are those generally employed as "modifiers" in synthetic rubber manufacture. The latex I employ may be a normal, modified synthetic rubber latex of the butadiene-styrene copolymer type (Buna S or GR-S) or it may be a similar polymer unmodified. Other butadiene-type synthetic latices may be utilized. The product represents an addition compound of the mercaptan and the polymer in which addition has taken place at the points of unsaturation in the polymer, thus at least partially saturating the rubber.

The reaction referred to is carried out by adding to or mixing with synthetic rubber latex the desired quantity of the mercaptan, preferably at or slightly above atmospheric temperatures.

It has been found that the addition reaction takes place readily in the presence of atmospheric oxygen, or of some other oxidizing agent such as potassium persulfate. A combination of an oxidizing agent with "redox" catalysts is also useful in conducting the reaction. Said "redox" catalysts are for example complex compounds of cobalt or iron, and one particularly effective is ferric pyrophosphate. Under the correct conditions of temperature and mercaptan concentration the reaction proceeds quite rapidly and in several hours it is possible to secure complete saturation of all the double bonds in the synthetic rubber molecules. In addition, some oxidative breakdown occurs, as evidenced by the formation of benzaldehyde when treating butadiene-styrene copolymer. Depending upon the type of mercaptan employed, the extent of saturation of the double bonds, and the amount of oxidative breakdown, varying degrees of softness can be produced.

Aliphatic mercaptans can be used in the process of preparing my novel plasticizer. One which has yielded extremely useful compositions is ethyl mercaptan. Ethyl mercaptan is an example of one mercaptan which is not normally useful as a modifier but which is applicable in my process. Another which I have successfully applied in a number of instances is t-butyl mercaptan, and this also is seldom useful as a modifier. Other mercaptans which I have found most useful include n-dodecyl and tert-dodecyl, both of which are widely used as modifiers. Other mercaptans are useful in the process such as the groups of tertiary mercaptans from $C_8$ to $C_{16}$, and may be preferred in certain instances. In general, aliphatic mercaptans ranging from methyl mercaptans and higher may be used. The preferred mercaptans are the alkyl mercaptans ranging from $C_2$ through $C_{16}$.

Similarly, latices of varying properties or types may be employed to prepare my plasticizer. When I employ it for softening standard GR-S, which constitutes generally its greatest volume application at the present time, I will generally prefer to use a standard GR-S latex for the preparation. In this latex, butadiene and styrene are copolymerized in the proportion 75-25 by weight in the presence of such catalysts and modifiers as to give a satisfactory rubber on coagulation. However, latices in which the proportion of butadiene to styrene differs, or in which through change in modifier action or other cause the properties of the polymer produced are altered may be used as desired or necessary. Similar plasticizers may be produced therefrom by suitably controlling the mercaptan addition; or plasticizers rather different in degree from those normally made can be made using such less usual latices. When it is desired to plasticize a butadiene-acrylonitrile copolymer (GR-A) it is desirable to use a plasticizer prepared from some of a latex of this polymer, and my process is also applicable to this and other similar cases.

Synthetic rubber, as is well known, has a considerable degree of unsaturation. The addition of mercaptans to the polymer doubtless proceeds by addition to, or saturation of these double bonds. It is obvious therefore that different amounts of mercaptan may be added theoretically up to 100 per cent saturation. The degree of mercaptan saturation secured affects the nature of the plasticizer produced, and generally the greater the degree of saturation the softer the plasticizer produced. Thus for instance when using ethyl mercaptan, plasticizers having the consistency of syrups are produced at 20 per cent saturation or above while those less saturated appear like soft rubber. Similarly, using n-dodecyl mercaptan, syrups may be produced at about 15 per cent saturation or above. When using tert-dodecyl mercaptan, it has generally proved difficult to produce a syrup. Saturation with mercaptan may theoretically proceed to 100 per cent but reaction becomes slow as saturation is approached, and products are seldom made over 60 or 70 per cent saturated. The quantity and rate of addition of mercaptan, as well as reaction conditions, catalyst used, etc., will determine the amount of mercaptan reacted or the degree of saturation of the rubber.

Differences in rate of reaction of various mercaptans with the latex exist, and from a practical viewpoint may serve to limit the degree of saturation obtained. Thus ethyl mercaptan reacts very rapidly, as does also n-dodecyl mercaptan. Tertiary butyl mercaptan and notably tertiary dodecyl mercaptan react more slowly, and in the last case, it is generally impractical to exceed about 15 per cent saturation. It is generally desirable to react sufficient mercaptan with the latex to produce at least about 1 per cent saturation.

The plasticizers may be produced in the presence of oxygen gas bubbling through the latex, or through the use of oxidizing catalysts, or even sometimes in the substantial absence of oxygen. I have found that air may satisfactorily be substituted for oxygen gas in most cases. Another way of operating which is often satisfactory to produce syrupy products comprises allowing oxygen to be present during the first hour of the reaction and thereafter using nitrogen gas. Catalysts may be substituted for the oxygen if desired. I have successfully employed such materials as potassium persulfate and a composition containing cobalt, oxalate, and ferric ions. The amount of oxygen supplied or the catalyst used affects the type of polymer produced.

Obviously, such factors as temperature and time of reaction will affect the properties of the plasticizer produced and degree of saturation secured. Temperatures are generally those from about normal atmospheric levels to somewhat higher levels, say from about 30 to about 150° F. A temperature of 122° F. is most commonly used and is generally very satisfactory. Reaction time may vary from an hour or less to perhaps 24 hours or more. Using ethyl mercaptan at 122° F. a reaction time of four hours is often convenient, while, with the less reactive mercaptans or at conditions less conductive to saturation, periods of about 20 hours are sometimes used.

The plasticizer produced by this process appears soft and is extremely sticky. It differs from the appearance of low molecular weight, low conversion GR-S, however. It is less plastic than this rubber, but is generally more liquid but at the same time with much higher viscosity. It is more coherent than such rubber, and can be drawn out into long "legs," contrasting with the short, weak "legs" of low conversion rubber.

The consistency of the plasticizers varies with the degree of saturation of the latex, from a soft rubber to a viscous syrup. Thus, with n-dodecyl mercaptan syrups are obtained at 14 or more per cent saturation, while at lower values the product is a soft rubber. When tert-butyl mercaptan was used syrups were obtained at above about 6 per cent saturation. In some instances, particularly when tertiary dodecyl mercaptan is employed, brittle, glassy products result. These have more limited usefulness, but in some cases may be desirable.

The products I prefer to use in most instances are viscous syrups, but it may in many cases be more convenient to employ a soft rubber-like product. It will be evident from the foregoing discussion that I may produce any desired type of composition within the scope of my invention, and products can be "tailored" to the requirements of the processing machinery.

In plasticizing the rubber using my novel composition it is most common to mill the rubber and plasticizer together through a cold, tight mill. Quantities of 5 to 10 per cent of the plasticizer are commonly incorporated, but the amount used is not critical and will vary with the products formed, type of rubber to be modified, and results desired. In some cases of the plasticizer may be used in proportions up to 50 per cent or more. When this procedure is carried out, I have found a most striking change takes place. Breakdown of the rubber by this physical process is immediate, much faster than by the unsatisfactory chemical processes heretofore used. After only two or three passes through the mill the rubber has the appearance of a well masticated sample, has developed long legs, lost its snap and acquired considerable tack.

The plasticizer may be milled in with the polymer at the time it is compounded for vulcanization and does not require a separate operation. Banburys or plasticator machinery may be used instead of a mill, and all standard equipment is applicable.

The plasticizing action is so immediate and complete that I have found it is possible to plasticize very tough rubbers which would otherwise be impractical to work in the mill. The advantages of very high molecular weight linear polymers can thereby be realized in the finished products.

It is an advantage of my process that by this very rapid and immediate breakdown the energy consumption of milling is greatly reduced, and thereby the cost of processing is much less. In the case of the tough rubbers aforementioned it serves to bring them within the range of practicable operation and cost; by other means their use is entirely impracticable. The capacity of the equipment is greatly increased by the rapidity of breakdown in my process, and this constitutes a further advantage of my process.

It is another advantage of my process that the process of physical softening which occurs is more satisfactory than that obtained during longer milling periods wherein oxidative degradation occurs on the mill.

The plasticized polymer resembles well worked synthetic rubber in all respects. No effect on working in the carbon black, or other loading materials, antioxidants, etc. is noted. The vulcanized products produced are entirely satisfactory rubbers. Modulus, tensile strength, and elongation fall within the normal desired ranges. Thus, using a sample of GR-S latex-n-dodecyl mercaptan addition product, the product produced when plasticizing with 5 per cent of this composition was approximately equal to one plasticized with 5 per cent of a commercial soft coal tar softener. Hysteresis of the rubbers was also approximately equal.

It is often observed with my new softener that a harder stock is produced when the quantity of softener employed in the milling operation is greater than when a smaller quantity of the softener is used. Thus, for example when 10 parts of a softener prepared by addition of dodecyl mercaptan to GR-S latex was employed to plasticize 100 parts of an abnormally tough GR-S polymer, the product produced when compounded and cured was harder than when only 5 parts of this softener was used and cured by the same formula. This indicates that much higher loadings of softener can be employed than is ordinarily feasible. Additional confirmation of this is afforded by the somewhat better tensile properties exhibited by the 10 parts stock. There are two factors which may contribute toward this behavior; the softener may take part in the vulcanization of the rubber in view of its high sulfur content, and the fact that the softener can be classified as a vulcanizable plasticizer.

The addition of a large amount of low molecular weight rubber to the batch might be expected to retard the cure. However, there was in the example cited in the paragraph above only a slight evidence of retardation and it may be that this is compensated to a considerable extent by the softener exhibiting an accelerating action on vulcanization. In view of the high sulfur content of the softener, some modification of the curing recipe may at times be necessary.

The desirability of vulcanizable plasticizers has been recognized ever since the true nature of vulcanization as a process of cross linking long linear chains with sulfur atoms became known. The theoretical advantage of such plasticizers lies in the fact that their molecules of relatively short chain length would form flexible cross linkages as distinguished from the rigid cross linkages provided by sulfur. My new compositions are unique in this respect and possess many advantages because of this vulcanization property.

The high tensile strength of rubber plasticized with my compositions probably results from the very small amount of working in the mill which is required. In ordinary processing practically all the molecules are probably broken down to some extent, resulting in low tensile strength. In my process, however, the softener is added as required and working on the mill is so slight as to cause little breakdown.

SPECIFIC EXAMPLES

*Example I*

GR-S latex, containing 100 g. of rubber, was treated with 90 g. of pure normal dodecyl mercaptan, added intermittently over a period of 2½ hours in a 500 ml. three necked flask at 122° F. Oxygen was slowly bubbled through the stirred mixture. Coagulation and removal of the excess mercaptan was brought about with isopropyl alcohol. After drying, the syrup obtained was found to be 14 per cent saturated. Approximately twenty parts of this softener was mixed with 100 parts of high Mooney viscosity GR-S on a cold tight mill. Breakdown was complete in from two to three passes through the mill. The product obtained exhibited long "legs," had lost its retractivity and showed as much "tack" as is usual with broken down GR-S. Without the softener, ten minutes of milling did not produce a comparable breakdown on another sample of the same GR-S.

*Example II*

A quantity of GR-S latex, containing 600 g. of rubber, which had been short-stopped with hydroquinone according to regular procedure, but which had not been stabilized with phenyl beta naphthylamine, was stirred continuously in a two liter, three necked flask at a temperature of 122° F. Commercial n-dodecyl mercaptan, to the extent of 210 g. (sufficient for 50 per cent saturation), was added intermittently over a period of 2½ hours. At the same time oxygen was bubbled slowly through the latex. The latex was then coagulated with isopropyl alcohol, which at the same time, dissolved and removed the excess of unreacted mercaptan. The syrup was dried at 140° F. for 15 hours in a circulating air oven. The product was 29.2 per cent saturated, as determined by sulfur analysis, and 26 per cent saturated as determined by its increase in weight.

A sample of GR-S polymer, prepared by polymerizing 75 parts butadiene and 25 parts styrene, according to the standard formula, was selected because of its abnormally tough characteristics which rendered it very difficult to process, and employed in comparative tests with the plasticizer prepared above and with a commonly used soft coal tar plasticizer (BRT #7).

The rubber was compounded according to the following standard formula:

|  | Parts by weight |
|---|---|
| GR-S | 100.0 |
| Zinc oxide | 5.0 |
| Carbon black | 50.0 |
| Sulfur | 2.0 |
| Captax | 1.5 |
| Plasticizer | Variable |

Samples were made with 5.0 and 10.0 parts by weight of my plasticizer, and with 5.0 parts of BRT #7. Portions were cured 25, 50, and 90 minutes respectively at 292° F.

Milling in 5.0 parts of my plasticizer smoothed out the rubber slightly better, but faster than the 5 parts of the soft coal tar, and milling was an easier, less energy consuming reaction. Use of 10.0 parts of the mercaptan treated latex was sufficient to cause the rubber to be smoothed out almost immediately on the mill. A gauge opening of 0.025 inch was then employed for milling; whereas, 0.020 inch was required for the chemical plasticizer.

The following tabulations, Table I and Table II, show representative properties determined on the rubber obtained in the above operation using 5.0 and 10.0 parts of my novel plasticizer and of BRT #7 respectively.

TABLE I
*Stress-strain properties*

| Softener | Minutes Cure At 292° F. | 300% Modulus (p.s.i.) | Ultimate Tensile Strength (p.s.i.) | Elongation, Per Cent |
|---|---|---|---|---|
| Temperature of Test | 80° F. | | | |
| 5 Per Cent Mercaptan-Treated Product | 25 | 740 | 1,340 | 465 |
|  | 50 | 1,400 | 2,800 | 500 |
|  | 90 | 2,000 | 2,590 | 400 |
| 10 Per Cent Mercaptan-Treated Product | 25 | 690 | 1,080 | 475 |
|  | 50 | 1,140 | 2,470 | 545 |
|  | 90 | 1,580 | 2,750 | 450 |
| 5 Per Cent Soft Coal Tar (BRT #7) | 25 | 840 | 2,050 | 590 |
|  | 50 | 1,470 | 2,800 | 500 |
|  | 90 | 1,950 | 2,800 | 400 |
| Temperature of Test | 200° F. | | | |
| 5 Per Cent Mercaptan-Treated Product | 50 | | 1,070 | 250 |
|  | 90 | | 970 | 200 |
| 10 Per Cent Mercaptan-Treated Product | 50 | | 900 | 250 |
|  | 90 | | 890 | 190 |
| 5 Per Cent BRT #7 | 50 | | 1,270 | 250 |
|  | 90 | | 890 | 200 |

TABLE II
*Hysteresis and other properties*

| Softener | Minutes Cure At 292° F. | Hysteresis Temp. Rise, °F. | Per Cent Initial Dynamic Compression | Per Cent Increase Dynamic Compression | Per Cent Permanent Set | Per Cent Resilience | Shore Hardness |
|---|---|---|---|---|---|---|---|
| 5 Per Cent Mercaptan-Treated Product | 25 |  |  |  |  | 42.4 | 51 |
|  | 50 | 85.3 | 12.5 | 4.0 | 2.0 | 56.3 | 57½ |
|  | 90 |  |  |  |  | 61.6 | 59 |
| 10 Per Cent Mercaptan-Treated Product | 25 |  |  |  |  | 41.4 | 54 |
|  | 50 | 94.3 | 12.6 | 5.0 | 2.8 | 53.9 | 59½ |
|  | 90 |  |  |  |  | 58.5 | 61½ |
| 5 Per Cent BRT #7 | 25 |  |  |  |  | 41.7 | 54 |
|  | 50 | 88.3 | 10.7 | 3.9 | 2.0 | 55.7 | 61 |
|  | 90 |  |  |  |  | 62.5 | 61½ |

The initial dynamic compression is determined on the Goodrich flexometer and is the deflection or compression, expressed in per cent, of a specimen of vulcanized compound 1 inch in height and 0.70 inch in diameter when placed under a fixed load of 143 pounds per square inch. The measurement is taken within 10-15 seconds after the test has commenced, which test consists in dynamically compressing and releasing the sample through a distance of 0.175 inch at a frequency of 30 cycles per second.

The per cent increase in dynamic compression is determined by reference back to the original height after a fixed period of compression and releasing (in this case a period of 15 minutes).

Example III

GR-S latex containing 100 gms. of rubber was treated with 42 gms. of pure ethyl mercaptan. These were allowed to react for eight hours in capped bottles. The vapor space in the bottles was flushed with oxygen at frequent intervals. Coagulation and removal of the excess mercaptan was brought about with isopropyl alcohol. After drying the syrupy product obtained was found to be 62 per cent saturated. Approximately 5 parts of this softener were mixed with 95 parts of high Mooney viscosity GR-S on a cold, tight mill. The product obtained had lost its retractivity, exhibited tack and long "legs" and was satisfactorily softened. Without the softener, a very long period of milling did not produce a comparable breakdown of this very tough rubber.

Example IV

GR-S latex containing 100 gms. rubber was treated with 31 gms. of tertiary butyl mercaptan in a manner similar to Example I. Oxygen flushing was carried out at intervals during the six hour reaction period. After coagulation a syrup was obtained which was 12 per cent saturated. Ten parts of this softener were mixed with 90 parts of high Mooney viscosity GR-S. The polymer was plasticized readily and quickly on a cold tight mill. Without the softener, breakdown on the mill was not accomplished.

The above examples were carried out using a standard GR-S recipe. This recipe had the following composition:

|  | Parts by weight |
|---|---|
| Butadiene | 75 |
| Styrene | 25 |
| Soap | 5 |
| Potassium persulfate | 0.3 |
| Dodecyl mercaptan | 0.3 |
| Water | 180 |

The latex was formed by carrying out the polymerization at 122° F. for about 12 hours.

Other latices produced by emulsion polymerization such as the acrylonitrile-butadiene copolymer (GR-A), and in general any synthetic rubber produced from a conjugated diolefin of the butadiene-1,3 type may be reacted with the mercaptan in a similar manner.

I claim:

1. A process for the production of a liquid plasticizer for synthetic rubber, which comprises reacting normal dodecyl mercaptan with a latex resulting from emulsion copolymerization of 1,3-butadiene and styrene, said reaction being carried out at a reaction temperature between 30 and 150° F. for a reaction time of 1 to 24 hours in the presence of an oxidizing agent and with an amount of said mercaptan such that the double bonds of the rubber in said latex are saturated to an extent between 15 and 60 per cent, and the resulting product has a syrupy consistency, coagulating the resulting latex reaction mixture, and recovering therefrom a syrupy product so produced.

2. The process of claim 1 in which said oxidizing agent comprises free oxygen passed into said latex during said reaction period.

3. In a process for milling on a rubber mill a synthetic rubber recovered from a latex resulting from emulsion copolymerization of a mixture of 1,3-butadiene and styrene, the improvement which comprises admixing on a rubber mill such a synthetic rubber with 5 to 10 parts of a liquid plasticizer prepared by the process of claim 1, per 100 parts by weight of said synthetic rubber.

4. A process for the production of a rubber plasticizer, which comprises polymerizing in aqueous emulsion a conjugated diolefin to produce a synthetic rubber latex, and admixing with and reacting with said latex an alkyl mercaptan having not more than sixteen carbon atoms per molecule in the presence of an oxidizing agent and at a reaction temperature between 30 and 150° F. for a reaction time not greater than 24 hours, with said reaction time and the kind and the amount of said mercaptan reacted sufficient to produce saturation of between 6 and 70 per cent of the double bonds of the rubber in said latex by addition of mercaptan thereto and to produce a liquid reaction product having a syrupy consistency after removal from the resulting latex reaction mixture by coagulation.

5. The process of claim 4 in which said oxidizing agent comprises free oxygen which is passed into said latex during said reaction period.

6. A process for the production of a rubber plasticizer, which comprises polymerizing in aqueous emulsion a conjugated diolefin to produce a synthetic rubber latex, admixing with and reacting with said latex and alkyl mercaptan having not more than sixteen carbon atoms per molecule in the presence of free oxygen admixed with said latex during said reaction and at a reaction temperature between 30 and 150° F. for a reaction time not greater than 24 hours, with said reaction time and the kind and the amount of said mercaptan reacted sufficient to produce saturation of between 15 and 60 per cent of the double bonds of the rubber in said latex by addition of mercaptan thereto and to produce a liquid reaction product having a syrupy consistency after removal from the resulting latex reaction mixture by coagulation, and recovering from a resulting reaction mixture a liquid syrupy reaction product so produced.

7. In a process for milling on a rubber mill a synthetic rubber produced by polymerization of a 1,3-butadiene, the improvement which comprises admixing on a rubber mill such a synthetic rubber with 5 to 10 parts of a liquid plasticizer prepared by the process of claim 4, per 100 parts by weight of said synthetic rubber.

CHARLES F. FRYLING.

REFERENCES CITED

The following references are of record in the file of this patent:

UNITED STATES PATENTS

| Number | Name | Date |
|---|---|---|
| 2,234,204 | Starkweather | Mar. 11, 1941 |
| 2,316,949 | Garvey | Apr. 20, 1943 |
| 2,411,954 | Burke | Dec. 3, 1946 |
| 2,425,840 | Schulze et al. | Aug. 19, 1947 |
| 2,463,224 | Vincent | Mar. 1, 1949 |

FOREIGN PATENTS

| Number | Country | Date |
|---|---|---|
| 390,532 | Great Britain | Apr. 7, 1933 |